(12) United States Patent
Fukano et al.

(10) Patent No.: US 8,353,498 B2
(45) Date of Patent: Jan. 15, 2013

(54) MANUAL SWITCHING VALVE

(75) Inventors: Yoshihiro Fukano, Moriya (JP); Tadashi Uchino, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 869 days.

(21) Appl. No.: 11/866,316

(22) Filed: Oct. 2, 2007

(65) Prior Publication Data
US 2008/0078968 A1   Apr. 3, 2008

(30) Foreign Application Priority Data
Oct. 3, 2006   (JP) ................................. 2006-271650

(51) Int. Cl.
*F16K 31/44* (2006.01)
(52) U.S. Cl. ................. 251/81; 251/80; 251/79
(58) Field of Classification Search ............. 251/79–81, 251/331, 100, 229; 137/553, 556
See application file for complete search history.

(56) References Cited

U.S. PATENT DOCUMENTS

| | | | |
|---|---|---|---|
| 2,881,602 A * | 4/1959 | Baker et al. ...................... | 251/81 |
| 3,050,078 A * | 8/1962 | Hooper .................... | 137/355.19 |
| 3,053,498 A * | 9/1962 | Dumm ............................ | 251/81 |
| 3,827,670 A * | 8/1974 | Saarem ........................... | 251/81 |
| 3,910,308 A | 10/1975 | Mack | |
| 4,460,078 A * | 7/1984 | Heide et al. .................. | 192/56.5 |
| 4,619,437 A * | 10/1986 | Williams et al. ................ | 251/81 |
| 5,722,894 A * | 3/1998 | Kojima ........................... | 464/37 |
| 6,138,712 A | 10/2000 | Hirose | |
| 6,196,523 B1 * | 3/2001 | Miyata et al. ................. | 251/331 |
| 6,196,532 B1 | 3/2001 | Otwell | |
| 6,481,459 B2 * | 11/2002 | Fukano et al. ................ | 137/553 |
| 2008/0157015 A1 | 7/2008 | Daido et al. | |
| 2009/0050832 A1 | 2/2009 | Ejiri | |

FOREIGN PATENT DOCUMENTS

| | | |
|---|---|---|
| JP | 55-119475 | 8/1980 |
| JP | 57-156681 | 10/1982 |
| JP | 60-049371 | 4/1985 |
| JP | 60-107477 | 7/1985 |
| JP | 62-093428 | 6/1987 |
| JP | 06-034067 | 2/1994 |
| JP | 11-037309 | 2/1999 |
| JP | 11-304040 | 11/1999 |
| JP | 11-344151 | 12/1999 |
| JP | 2000-018283 | 1/2000 |
| JP | 2002-303340 | 10/2002 |
| JP | 2004-019784 | 1/2004 |
| JP | 2004-176856 | 6/2004 |
| JP | 2005-344918 | 12/2005 |
| KR | 0417418 | 5/2006 |
| WO | 2005/093306 | 10/2005 |
| WO | WO 2006/054221 | 5/2006 |
| WO | WO 2006/093036 | 9/2006 |

* cited by examiner

*Primary Examiner* — John K Fristoe, Jr.
*Assistant Examiner* — Andrew J Rost
(74) *Attorney, Agent, or Firm* — Paul A. Guss (57) ABSTRACT

In a manual switching valve, which enables a valve plug to be opened and closed manually, a piston is threadedly engaged with a shaft that is inserted through a housing, wherein a handle having a switching mechanism therein is installed on an upper end of the shaft. After a valve plug is seated on a valve seat, any further turning force applied to the handle is interrupted without being transmitted to the shaft owing to the fact that balls disengage from tooth portions of the shaft.

8 Claims, 7 Drawing Sheets

FIG. 7 ously closed. The structure cannot prevent the
application of an excessive force on the valve plug when the

MANUAL SWITCHING VALVE

BACKGROUND OF THE INVENTION

1. Field of the Invention

The present invention relates to a manual switching valve for enabling switching of a flow passage state of a fluid under the displacement action of a valve plug.

2. Description of the Related Art

Heretofore, a manual switching valve has been known in which a valve plug is disposed displaceably inside of a body equipped with a passage therein through which a fluid flows, and wherein a communication state of the fluid is switched by seating and unseating the valve plug on a valve seat that faces the passage. Generally, in such a manual switching valve, when the communication state of the fluid is changed, an operator rotates a handle that makes up an operating element, whereby the valve plug is displaced along an axial direction for seating and unseating the valve plug with respect to the valve seat, and thus switching between valve closed and valve open states.

However, for example when the manual switching valve is placed in a valve closed state, in the event that the operator mistakenly rotates the handle with an excessive rotational torque, the valve plug is displaced greater than a predetermined amount toward the side of the valve seat, such that the valve plug presses against the valve seat with an excessive force. In this case, there is a concern that the valve plug and/or the valve seat may be damaged by the excessive force (torque), to such an extent that the durability thereof is lowered. For this purpose, a manual switching valve is known in which contact at an excessive force between the valve plug and the valve seat can be prevented.

For example, as disclosed in Japanese Laid Open Patent Publication No. 2005-344918, in such a manual switching valve, in the event that a valve closed state is made by seating the valve plug onto the valve seat of the valve main body, a slide nut, which is threadedly engaged with a handle, is rotated by turning the handle, and a piston that is threaded into an interior part of the slide nut is displaced toward the valve seat so that the valve plug is seated on the valve seat. In addition, in the case that the handle is rotated further, the slide nut, which is threadedly engaged between the handle and the piston, is displaced upwardly, whereupon the slide nut becomes detached from the piston, and as a result the threaded state with respect to the piston is released. Owing thereto, the handle is simply rotated idly and the rotational force imposed on the handle is not transmitted to the piston, such that further displacement of the valve plug toward the valve seat is prevented.

However, in this conventional technique, although a structure is provided for releasing the threaded engagement of the piston and the slide nut in order to interrupt the rotational force from the handle, when the manual valve is used again, it is necessary to reestablish the threaded engagement between the piston and the slide nut. For this purpose, a spring is provided separately, wherein the slide nut is urged toward the piston and guided into threaded engagement therewith by the spring. In this manner, with the manual valve according to the conventional technique, the structure for enabling prevention of further additional pressing force of the valve plug with respect to the valve seat upon closing the valve is considerably complex.

Further, such a structure only prevents application of excessive force on the valve plug and the valve seat when the valve is completely closed. The structure cannot prevent the application of an excessive force on the valve plug when the valve is completely open, in a state in which the valve plug is separated away from the valve seat.

SUMMARY OF THE INVENTION

A general object of the present invention is to provide a manual switching valve having a simple structure, which prevents loads that are imparted to the valve plug at times when the valve is both completely open and completely closed, thereby improving durability of the manual switching valve.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
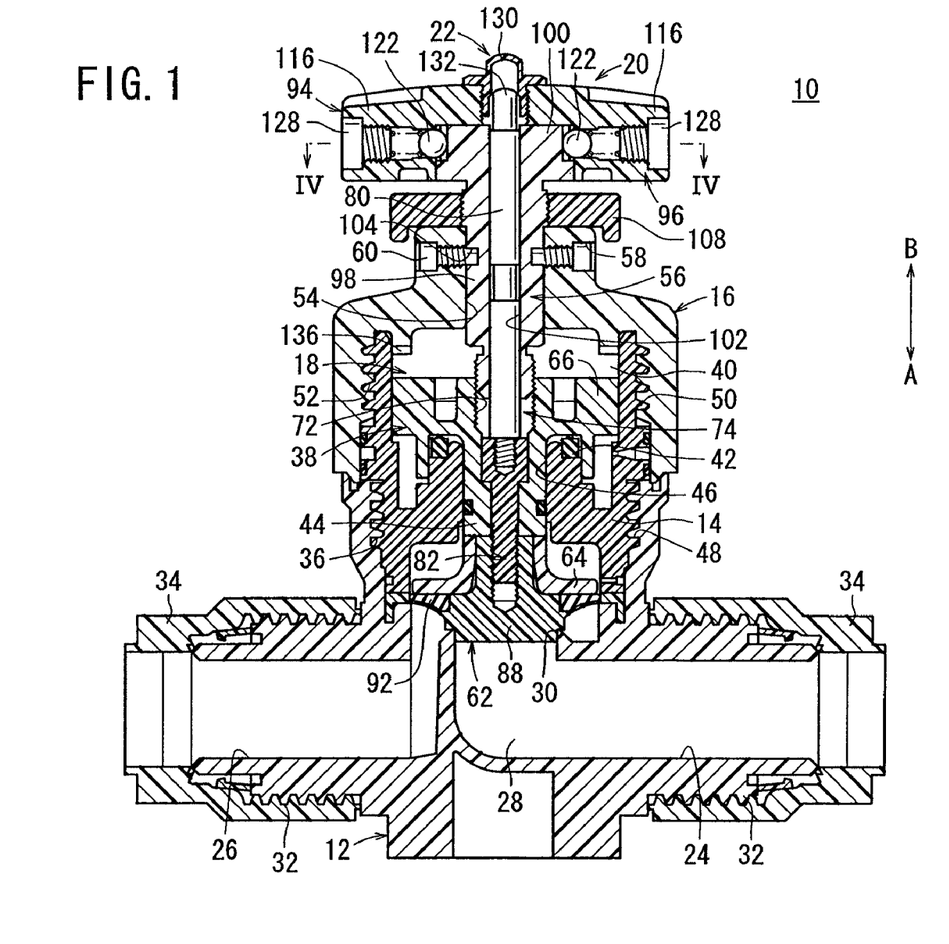
FIG. 1 is an overall vertical cross sectional view of a manual switching valve according to an embodiment of the present invention.

In FIG. 1, reference numeral 10 indicates a manual switching valve according to an embodiment of the present invention.

Figure 2:
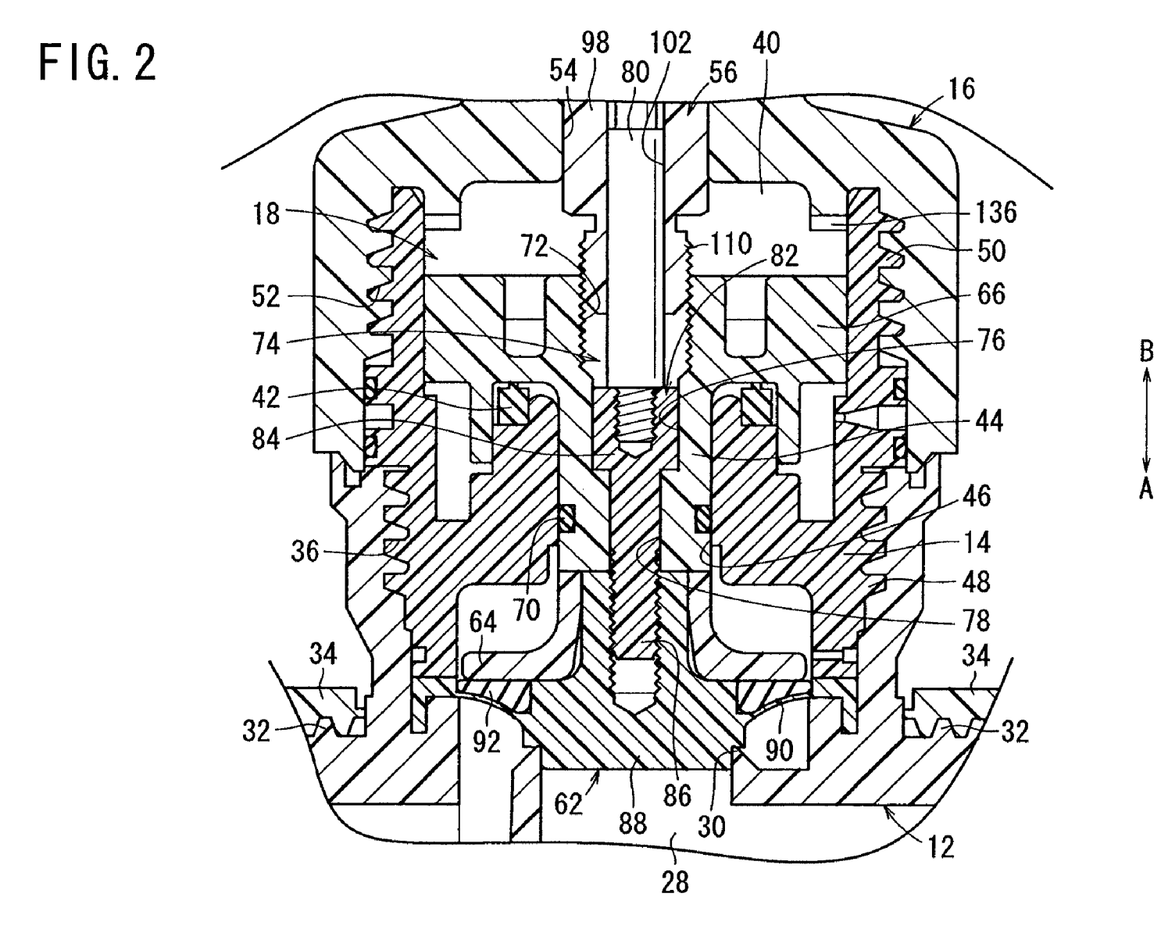
FIG. 2 is an enlarged cross sectional view showing a vicinity of a valve plug in the manual switching valve of FIG. 1.
Figure 3:
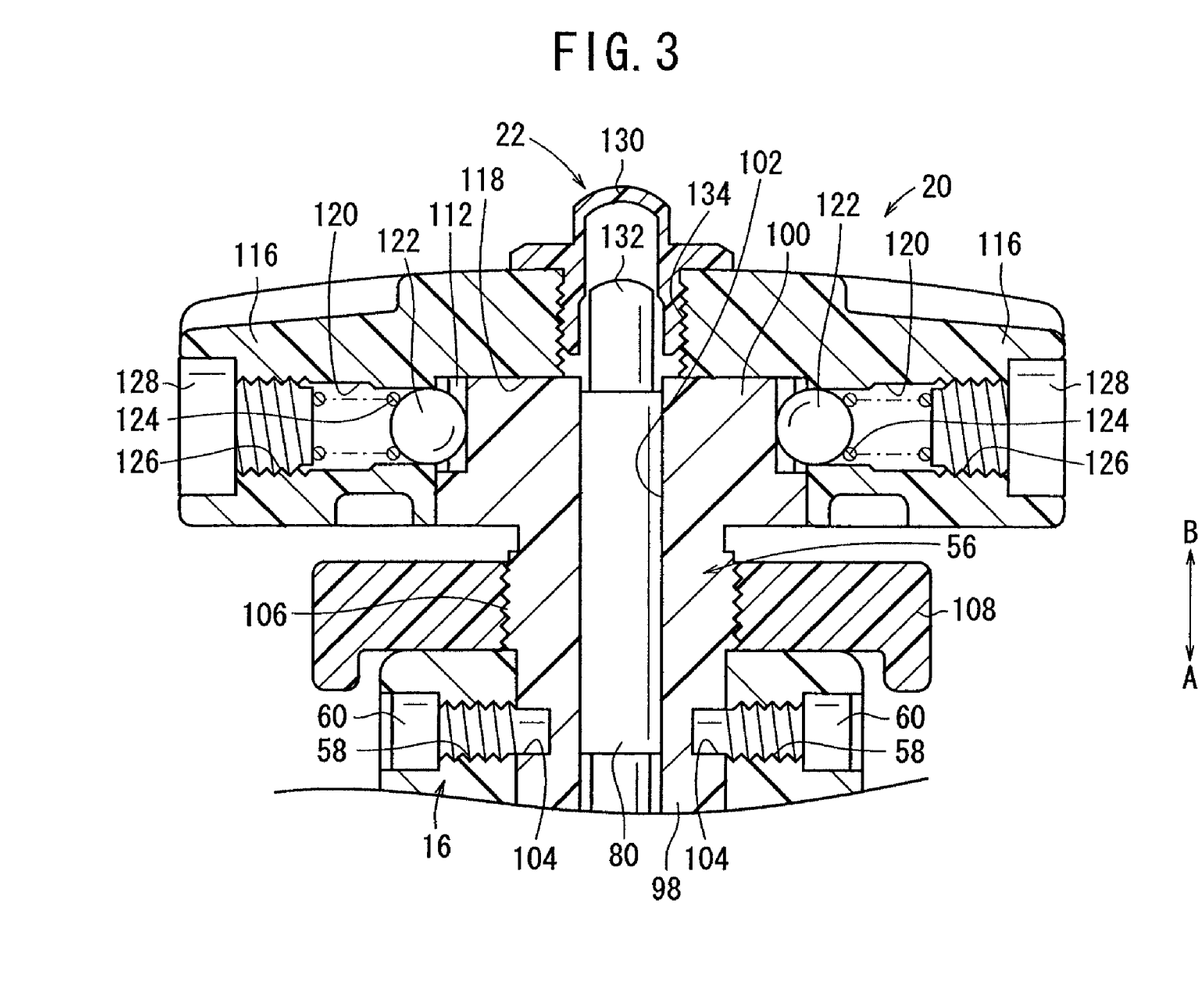
FIG. 3 is an enlarged cross sectional view showing a vicinity of a flow controller in the manual switching valve of FIG. 1.

The manual switching valve 10, as shown in FIGS. 1 to 3, includes a valve body (body) 12 through which a pressure fluid flows internally, a tubular connecting body (body) 14 connected to an upper portion of the valve body 12, a housing (body) 16 connected so as to cover an upper portion of the connecting body 14, a valve mechanism 18 disposed inside of the connecting body 14 and the housing 16, a flow controller 20 for controlling the flow condition of the fluid that flows inside the valve body 12, and an indicator section (display element) 22, which indicates valve closed and valve open states of the valve mechanism 18.

The valve body 12 includes a first port 24 to which a pressure fluid is introduced from an unillustrated pressure fluid supply source, a second port 26 through which the pressure fluid is discharged, and a communication passage (passage) 28 that communicates between the first port 24 and the second port 26. Further, a valve seat 30 on which a valve plug 62, to be discussed later, is seated is formed in the communication passage 28.

The communication passage 28 is interposed between the first port 24 and the second port 26, such that the first port 24 and the second port 26 are formed on a straight line, and screw threads 32 are engraved along an axial direction on exterior portions of the first port 24 and the second port 26. In addition, tubular shaped connecting nuts 34 are threaded into engagement respectively with the screw threads 32. By gripping pipes (not shown) between the ends of the first and second ports 24, 26 and the connecting nuts 34, the regions where the pipes are connected are maintained in a hermetic state.

The upper portion of the valve body 12 is formed in a tubular shape, wherein the valve body 12 and the connecting body 14 are connected by threaded engagement of an outer circumferential part of the connecting body 14 with first screw grooves 36 engraved on the inner circumferential surface of the valve body 12.

A piston chamber 40, in which a piston 38 (to be described later) is disposed so as to be displaceable along an axial direction (in the directions of the arrows A and B), is formed in an interior portion of the connecting body 14. A shock absorber 42 is installed through an annular groove on an end surface facing the piston chamber 40. More specifically, the piston 38 disposed in the piston chamber 40 is displaced toward the valve body 12 (in the direction of the arrow A), whereupon a lower surface of the piston 38 comes into abutment against the shock absorber 42, for buffering shocks caused thereby.

Further, in the center of the connecting body 14, a piston hole 46 is formed extending in the axial direction, into which a small diameter portion 44 of the piston 38 is inserted. The piston hole 46 communicates between the communication passage 28 of the valve body 12 and the piston chamber 40.

Moreover, second screw grooves 48 which are threaded into the valve body 12, and third screw grooves 50 which are threaded into an inner circumferential portion of the housing 16, are formed respectively on an outer circumferential surface of the connecting body 14. The third screw grooves 50 are threaded and engaged with fourth screw grooves 52, which are engraved on an inner circumferential surface of the housing 16, whereby the housing 16 and the connecting body 14 are integrally connected. The second screw grooves 48 of the connecting body 14 are threaded and engaged with the first screw grooves 36 of the valve body 12.

The housing 16 is formed with an upwardly directed reduced diameter bottomed cylindrical shape having a reduced diameter portion, wherein a shaft hole 54 is formed along the axial direction in a center portion thereof. A shaft 56 that constitutes a flow controller 20 is inserted through the shaft hole 54. In addition, fourth screw grooves 52, with which the third screw grooves 50 of the connecting body 14 are threaded and engaged, are engraved on an inner circumferential surface of the housing 16. The housing 16 and the connecting body 14 are connected substantially coaxially through the third and fourth screw grooves 50 and 52.

Further, a pair of pin holes 58 are formed on an upper portion of the housing 16, extending in a radially inward direction from an outer circumferential surface of the housing 16. The pin holes 58 are arranged and positioned on a straight line so as to face and confront the center of the shaft hole 54, and further, so as to communicate respectively with the shaft hole 54. Pins 60 are threaded respectively into the pin holes 58, such that ends of the pins 60 engage with the shaft 56 that is inserted through the shaft hole 54.

The valve mechanism 18 includes the piston 38, which is disposed displaceably in the piston chamber 40, the valve plug 62 which is arranged on an end of the piston 38, and a ring 64 that guides a portion of the valve plug 62.

The piston 38 has a T-shaped cross section, with a large diameter portion 66 that abuts against an inner wall surface of the piston chamber 40 in the connecting body 14, and a small diameter portion 44, which projects downward (in the direction of the arrow A) with respect to the large diameter portion 66 and is inserted into the piston hole 46 of the connecting body 14. A piston packing 70 is installed in an annular groove on an outer circumferential surface of the small diameter portion 44, wherein the piston packing 70 abuts with the piston hole 46, thus maintaining a hermetic state in the piston chamber 40.

A screw hole 72, into which an end of the shaft 56 is threaded and engaged, is formed along the axial direction substantially in the center of the large diameter portion 66, whereas a penetrating hole 74 is formed substantially in the center of the small diameter portion 44 along the axial direction on a straight line with the screw hole 72. More specifically, the screw hole 72 and the penetrating hole 74 communicate in the piston 38, penetrating from one end of the piston 38 to another end thereof.

The penetrating hole 74 is formed from a first hole portion 76 formed on a side of the screw hole 72 and which is slightly reduced in diameter with respect to the screw hole 72, and a second hole portion 78 formed on a side of the valve plug 62 (in the direction of the arrow A) with respect to the first hole portion 76, as well as being reduced in diameter with respect to the first hole portion 76. A connecting shaft 82, which connects an indicator shaft 80 of the indicator section 22 and the valve plug 62, is inserted displaceably through the penetrating hole 74.

The connecting shaft 82 includes a wide shaft portion 84, which is inserted through the first hole portion 76 of the penetrating hole 74 and connected to the indicator shaft 80, and a narrow shaft portion 86, which is reduced in diameter with respect to the wide shaft portion 84, and which is inserted through the second hole portion 78 of the penetrating hole 74 and connected to the valve plug 62. More specifically, the wide shaft portion 84 of the connecting shaft 82 is formed with a diameter corresponding to the first hole portion 76 of the penetrating hole 74, whereas the narrow shaft portion 86 is formed with a diameter corresponding to the second hole portion 78 of the penetrating hole 74. In addition, the wide shaft portion 84 of the connecting shaft 82 engages with a step in the penetrating hole 74, the step occurring between the first hole portion 76 and the second hole portion 78.

The valve plug 62 is formed, for example, from a resin material and is connected with respect to the connecting shaft 82, wherein the connecting shaft 82 is threaded into an upper portion substantially in the center of the valve plug 62. The valve plug 62 further is formed of a valve part 88 that projects substantially centrally therefrom in a downward direction (the direction of the arrow A) and is seated on the valve seat 30, and a skirt 90 that extends in a radial outward direction from an outer edge of the valve part 88, wherein an outer edge of the skirt 90 is sandwiched and gripped between the valve body 12 and the connecting body 14.

Further, a ring 64 is disposed on an outer circumferential side of the valve plug 62 between the valve plug 62 and the piston 38, wherein the ring 64 is displaced in unison with the valve plug 62, and a protective member 92 is arranged between the skirt 90 of the valve plug 62 and the ring 64. The ring 64 is formed in a tubular shape on an outer circumferential side of the valve plug 62, wherein a lower portion thereof is bent in a radially outward direction substantially parallel to the skirt 90 of the valve plug 62.

The protective member 92 is formed of an elastic material such as rubber or the like, and is arranged between the upper surface of the skirt 90 and the ring 64, whereby the protective member 92 is in intimate contact with the skirt 90, which has a thin-walled formation. As a result, accompanying displacement of the valve plug 62, the skirt 90 is protected in the case that the skirt 90 is bent.

In addition, the valve plug 62 is placed in a valve closed state, interrupting communication between the first port 24 and the second port 26, by seating the valve part 88 thereof with respect to the valve seat 30 of the valve body 12, and conversely, the valve plug 62 is placed in a valve open state, thus opening communication through the communication passage 28 between the first port 24 and the second port 26, by separating the valve part 88 away from the valve seat 30.

The flow controller 20 includes a shaft 56 that is rotatably maintained and inserted through the shaft hole 54 of the housing 16, a handle (operating element) 94 that is rotatably supported on an end of the shaft 56, and a switching mechanism 96 disposed internally in the handle 94, and which enables switching of a transmission state of a rotational force T applied to the handle 94 with respect to the shaft 56.

The shaft 56 is formed, for example, from a resin material, and is constructed from a shaft portion 98 which is inserted into the housing 16 and an expanded diameter portion 100 disposed on an upper end of the shaft portion 98, which is expanded in diameter in a radially outward direction. An insertion hole 102 is formed therein, which penetrates through the shaft portion 98 and the expanded diameter portion 100. The indicator shaft 80 of the indicator section 22, which shall be discussed later, is inserted through the insertion hole 102.

An annular pin groove 104 is formed along an outer circumferential surface at a substantially central region of the shaft portion 98. Ends of the pair of pins 60, which are installed in the housing 16, are capable of engaging respectively within the pin groove 104. More specifically, displacement of the shaft 56 in the axial direction (the directions of arrows A and B) is regulated by the pair of pins 60, while enabling the shaft 56 to be displaceable in a rotational direction perpendicular to the aforementioned axial direction.

Further, male threads 106 are provided on the shaft 56 between the expanded diameter portion 100 and the pin groove 104, wherein a disk shaped lock plate 108 is provided in threaded engagement with the male threads 106. The lock plate 108 is disposed between an upper end of the housing 16 and the handle 94, such that by threaded rotation of the lock plate 108, the lock plate 108 is displaced in an axial direction (the directions of arrows A and B) of the shaft 56 through the male threads 106. In addition, by abutment of the lock plate 108 against an upper end of the housing 16, rotational displacement of the shaft 56, which is engaged through the male threads 106, is regulated. More specifically, the lock plate 108 functions as a locking structure for regulating rotational displacement of the shaft 56.

Furthermore, a screw portion 110 (see FIG. 2) having threads engraved along an outer circumferential surface thereof is formed on a lower end of the shaft 56. The screw portion 110 is threaded into the screw hole 72 of the piston 38. As a result, by rotating the shaft 56, the threaded piston 38 is displaced in the axial direction (the directions of arrows A and B) inside the piston chamber 40.

Figure 4:
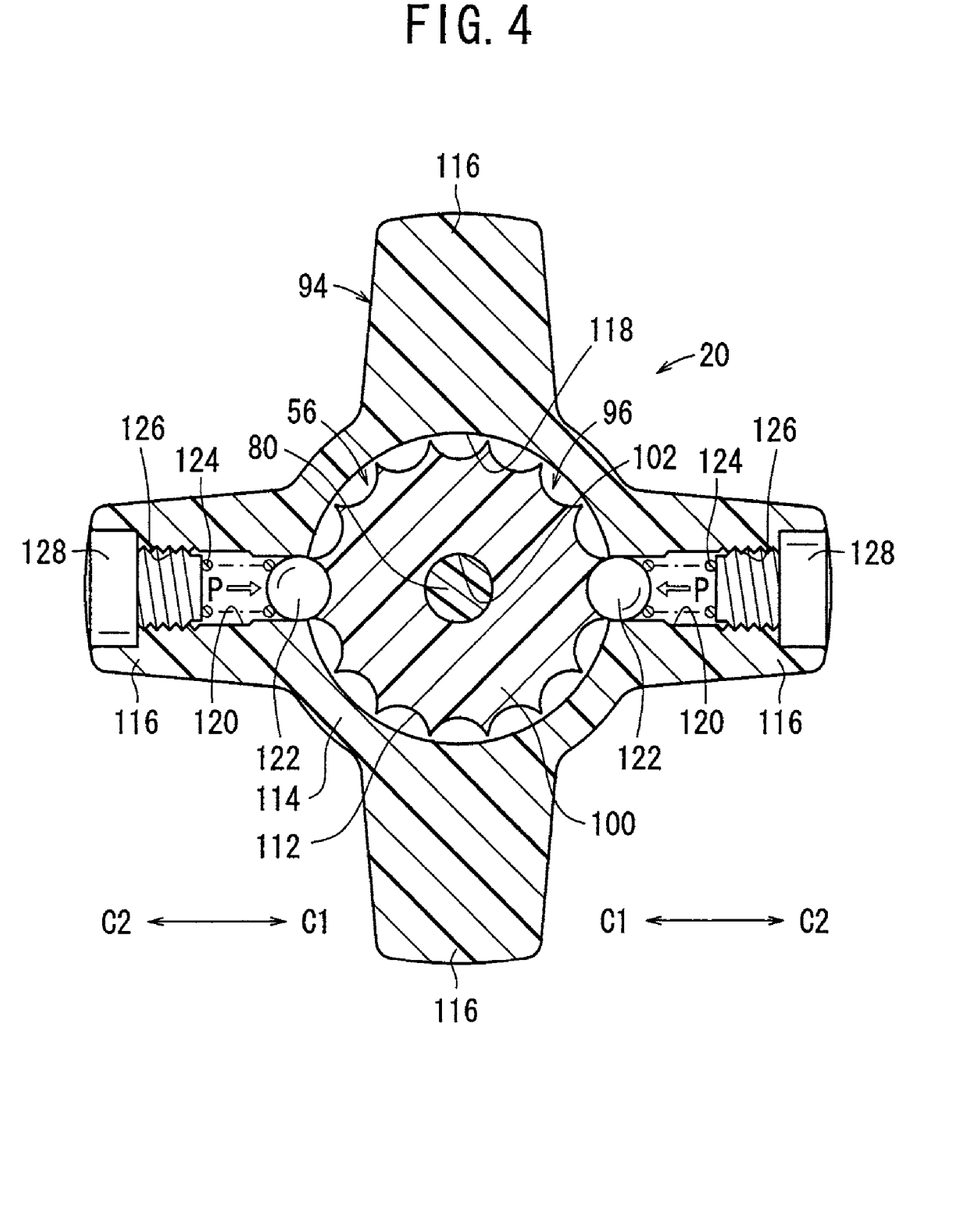
FIG. 4 is a cross sectional view taken along line IV-IV of FIG. 1.

As shown in FIGS. 3 and 4, a plurality of tooth portions 112 making up the switching mechanism 96 are provided circumferentially on an outer circumferential surface of the expanded diameter portion 100.

The handle 94 includes a main body 114 formed in a substantially circular shape, and a plurality of (for example, four) gripping members 116 projecting in radially outward directions at each of equal angular intervals (for example, 900) about the center of the main body 114. A recess 118 in which the expanded diameter portion 100 of the shaft 56 is inserted is formed in the main body 114, facing a side of the housing 16. The expanded diameter portion 100 of the shaft 56 is accommodated in the handle 94 via the recess 118.

Ball holes 120 are formed in the plural gripping members 116, which penetrate toward a side of the main body 114 along the gripping members 116. The ball holes 120 are disposed respectively in two of the gripping members 116, which are arranged on a straight line about the center of the main body 114, and communicate respectively with the recess 118 of the main body 114.

Balls 122 and springs 124 constituting the switching mechanism 96 are accommodated within the ball holes 120. Female threads 126 are engraved on ends of the outside openings of the ball holes 120, into which bolts 128 making up the switching mechanism 96 are threaded. As a result, respective ends of the ball holes 120 are closed by the bolts 128.

The switching mechanism 96 is formed by a plurality of tooth portions 112, which are disposed on the expanded diameter portion 100 of the shaft 56 and formed along an outer circumferential surface thereof, a pair of balls 122 inserted into the ball holes 120 of the handle 94 for engagement with the tooth portions 112, bolts 128 that block and close the outer circumferential side of the ball holes 120, and springs 124, which are interposed between the balls 122 and the bolts 128 and which urge the balls 122 in directions toward the shaft 56 (in the direction of the arrow C1 in FIG. 4).

The tooth portions 112 are formed with arcuate shapes, recessed radially inwardly at a predetermined radius on the expanded diameter portion 100, and arranged at each of equal angular intervals along the outer circumferential surface of the expanded diameter portion 100.

The balls 122 are formed, for example, from resin materials, wherein the radial dimension of the balls 122 is set such that it is substantially the same as the radial dimension of the tooth portions 112, which are formed with arcuate shapes as described above. In addition, the balls 122 are pressed radially inward toward the shaft 56 (in the direction of the arrow C1) by an elastic force P (see FIG. 4) of the springs 124, which are interposed between the balls 122 and the bolts 128, so as to engage with respect to the tooth portions 112 of the shaft 56.

Stated otherwise, the pair of balls 122 engages with the tooth portions 112 while being arranged mutually on a straight line about the center of the shaft 56, whereby the expanded diameter portion 100 of the shaft 56 is maintained while being gripped from both sides by the balls 122 (see FIG. 4). As a result, the pressing force by the balls 122 is imposed at an appropriately balanced condition with respect to the expanded diameter portion 100, and the pressing force is imposed without eccentricity with respect to the expanded diameter portion 100.

The indicator section 22 is formed by an indicator shaft 80 that is inserted displaceably through the inside of the shaft 56, and a cap 130 shaped in the form of a bottomed cylinder, installed on an upper part of the handle 94 and enabling visual inspection of the end of the indicator shaft 80.

The indicator shaft 80 is formed axially with a substantially uniform diameter, wherein a visually perceivable element 132 disposed on the upper end thereof can be visually confirmed from the outside through the cap 130, and wherein the lower end thereof is screw engaged with respect to the connecting shaft 82. More specifically, the indicator shaft 80 is connected to the connecting shaft 82 and is displaceable along the axial direction together with the connecting shaft 82 and the valve plug 62. Moreover, so that the visually perceivable element 132 is easily visually confirmed from the outside, the visually perceivable element 132 is preferably colored with a color, for example, such as red, orange or the like.

The cap 130 is threadedly engaged in an installation hole 134 substantially in the center of the handle 94, and is installed so as to project a predetermined length with respect to an upper surface of the handle 94. The interior of the cap 130 communicates with the insertion hole 102 of the shaft 56 and the cap 130 is positioned coaxially therewith. Further, the cap 130 is made from a transparent or semitransparent resin material, for example.

As a result, by displacement of the indicator shaft 80, the visually perceivable element 132 is moved into the interior of the cap 130, so that the visually perceivable element 132 can be visually confirmed from the outside.

The manual switching valve 10 according to the embodiment of the present invention is basically constructed as described above. Next, operations and effects of the manual switching valve 10 shall be explained. FIG. 1 shows a valve closed state, in which the valve plug 62 is displaced toward the valve seat 30 (in the direction of the arrow A) and is seated on the valve seat 30, thereby interrupting communication between the first port 24 and the second port 26. Pipes (not shown) are connected respectively beforehand to each of the first and second ports 24 and 26 through the connecting nuts 34. Further, since the visually perceivable element 132 of the indicator section 22 is in a state where it has not moved into the projecting region of the cap 130, the visually perceivable element 132 cannot be confirmed visually from the outside, thereby indicating a valve closed condition (OFF state).

In the valve closed state, a worker (not shown) grips the handle 94 and rotates it in a predetermined direction, whereby the balls 122 accommodated within the gripping members 116 are rotated integrally therewith. In this case, since the balls 122 are pressed toward the shaft 56 (in the direction of the arrow C1) at a predetermined pressing force by the elastic force P of the springs 124, the predetermined rotational force T imparted to the handle 94 is transmitted to the shaft 56 due to an engagement action of the balls 122 therein. As a result, the handle 94 and the shaft 56 are rotated together integrally.

More specifically, the elastic force P of the springs 124 (pressing force with respect to the balls 122) that acts to energize the balls 122 is set beforehand to exceed the rotational force T imparted to the handle 94 (P>T).

In addition, the piston 38 that is in threaded engagement with the shaft 56 is displaced, by rotation of the shaft 56, in a direction (the direction of the arrow B) separating away from the valve seat 30, while the connecting shaft 82 that is inserted internally through the piston 38 and the indicator shaft 80 is displaced upwardly (in the direction of the arrow B).

Figure 5:
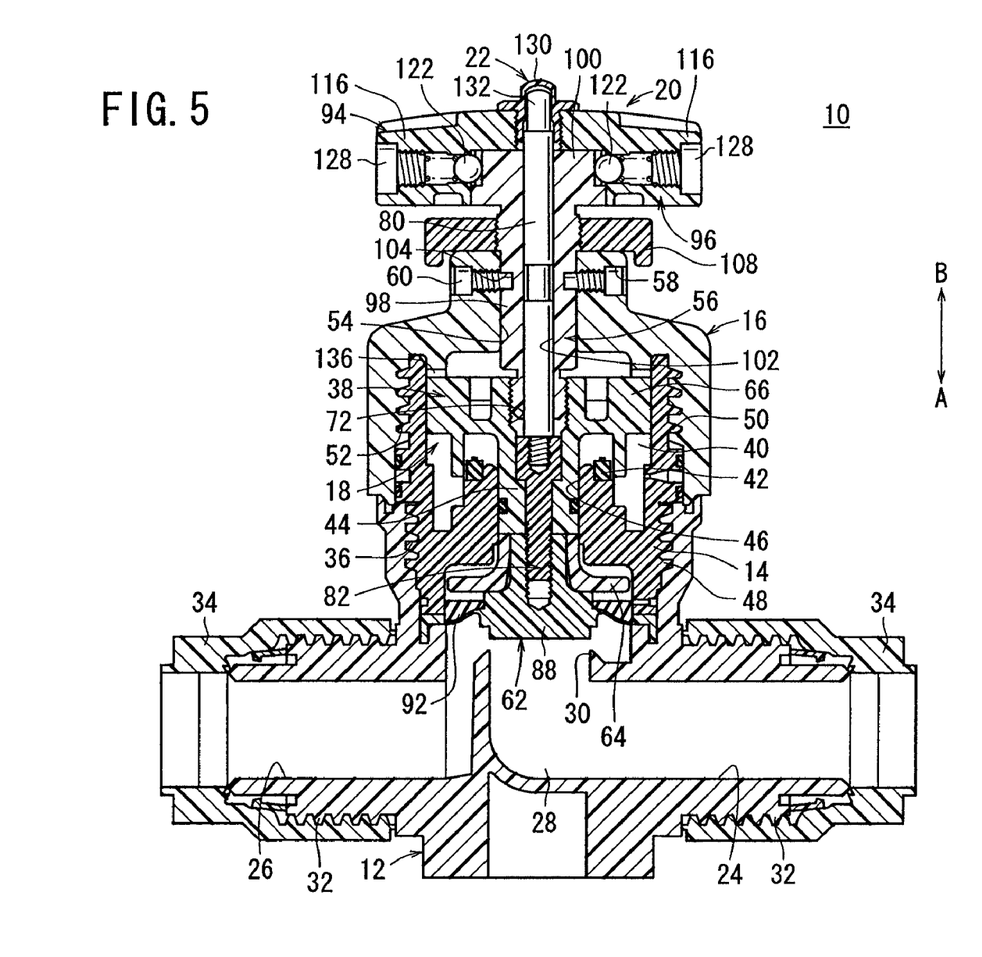
FIG. 5 is a vertical cross sectional view showing a valve open state of the manual switching valve of FIG. 1.

As a result, as shown in FIG. 5, the valve plug 62 connected to the connecting shaft 82 is displaced upwardly while the skirt 90 is flexed, and the valve part 88 separates away from the valve seat 30. Because the pair of pins 60 engages in the pin groove 104, the shaft 56 is not displaced in an axial direction (the directions of arrows A and B) with respect to the housing 16, but is only displaced rotationally with respect to the housing 16.

Consequently, a valve open condition (ON state) results, wherein the first port 24 and the second port 26 are placed in communication through the communication passage 28.

In addition, by turning the handle 94 even further, the upper surface of the piston 38 abuts against the stopper 136, which is formed on an inner wall surface of the housing 16, resulting in a completely open state in which further upward displacement of the piston 38 and the valve plug 62 is regulated.

On the other hand, in the manual switching valve 10, when an operator (not shown) rotates the handle 94 in order to enable displacement of the valve plug 62 and switch between valve closed and valve open states, and when in the aforementioned completely open state in which the piston 38 abuts against the stopper 136, for example, it is conceivable that the operator may mistakenly continue to rotate the handle 94. In this case, a large rotational force Tmax (rotational torque), which is greater than the ordinary rotational force T used for opening the valve plug 62, is imparted with respect to the handle 94.

Figure 6:
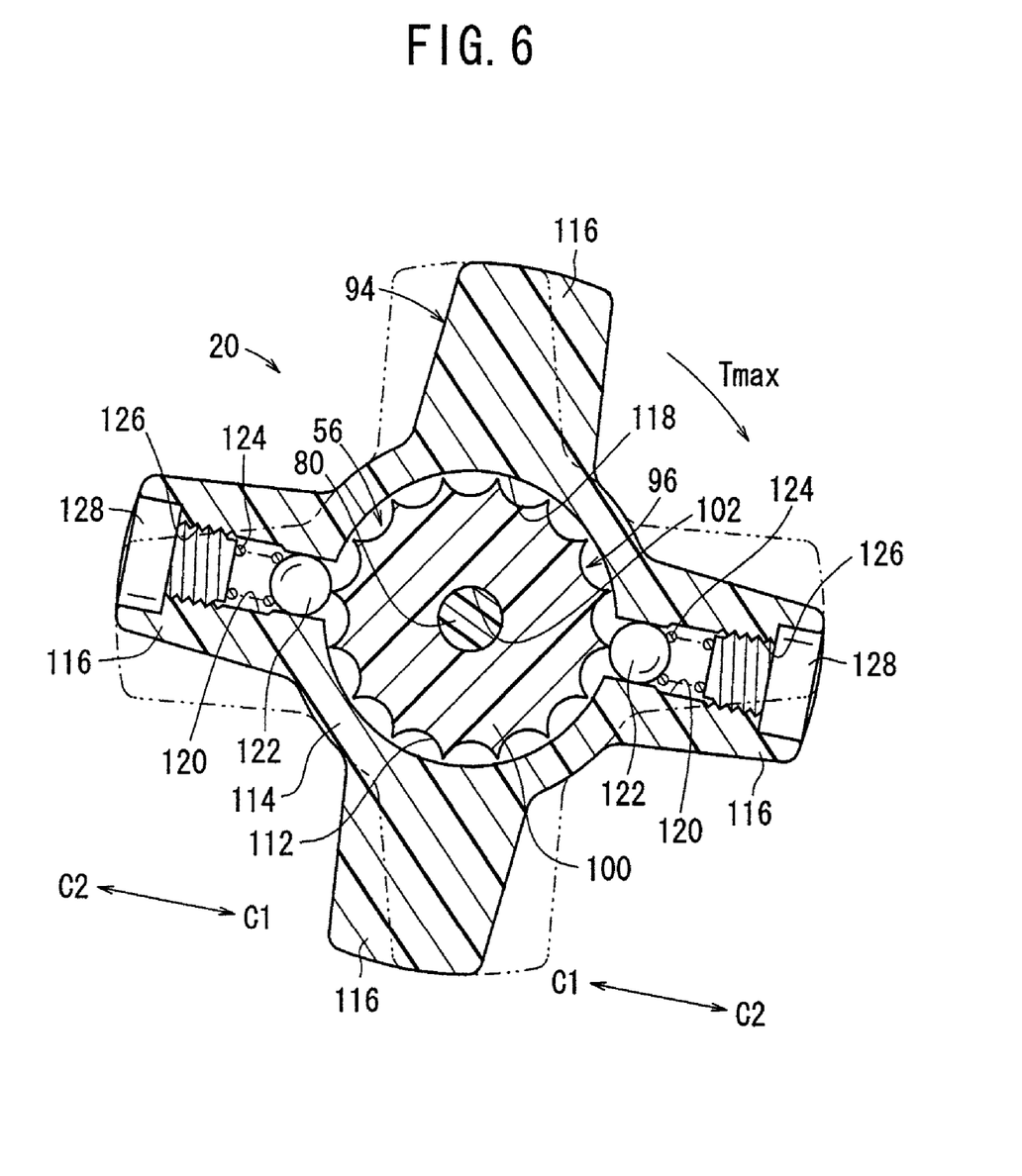
FIG. 6 is a cross sectional view showing a condition in which balls making up a switching mechanism are separated away from tooth portions of a shaft, as a result of rotating a handle illustrated in FIG. 4 at an excessive rotational force.

In this case, the rotational force Tmax imparted to the handle 94 becomes greater than the elastic force P of the springs 124, and the balls 122 that are pressed by the elastic force P are displaced toward the springs 124 (in the direction of the arrow C2), while being pushed out from the tooth portions 112 of the shaft 56 (see FIG. 6). Specifically, by rotation of the balls 122 together with the handle 94, the balls 122 run over into engagement with other tooth portions 112, which are adjacent to the tooth portions 112 in which the balls 122 were previously engaged, whereupon the balls 122 also are displaced toward the bolts 128 (in the direction of the arrow C2) in opposition to the elastic force P of the springs 124. As a result, in the switching mechanism 96, the state of engagement between the balls 122 and the shaft 56 is released. That is, the excessive rotational force Tmax imparted to the handle 94 overcomes the elastic force P (pressing force) of the springs 124 (Tmax>P).

Figure 7:
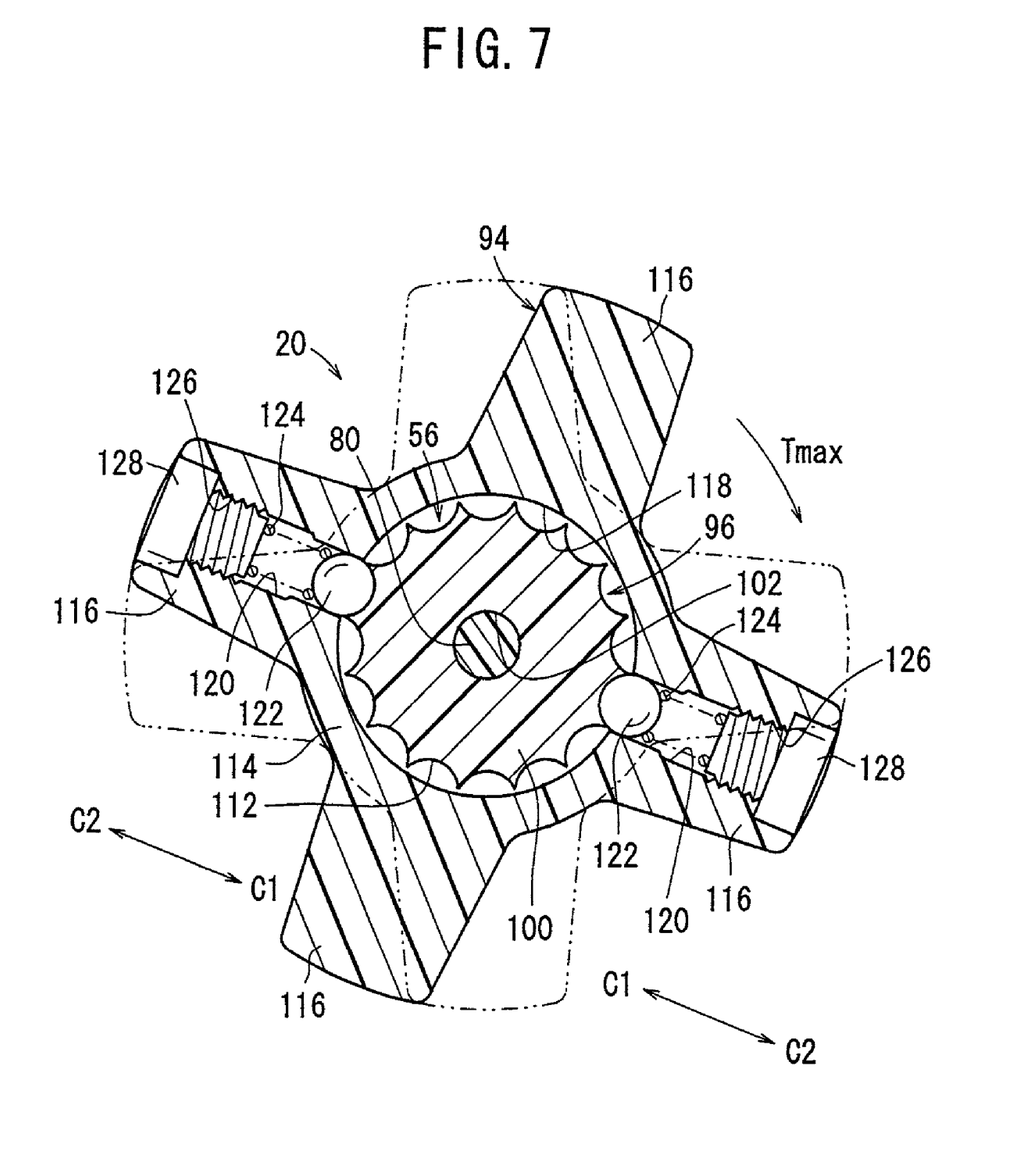
FIG. 7 is a cross sectional view showing a state in which the balls engage within another adjacent tooth portion upon further rotation of the handle shown in FIG. 6.

As a result, only the handle 94 is rotationally displaced with the balls 122 accommodated therein, and the rotational force Tmax imposed on the handle 94 is not transmitted with respect to the shaft 56. Stated otherwise, only the handle 94 is rotationally displaced by itself with respect to the shaft 56, and the rotational force Tmax from the handle 94 to the shaft 56 is interrupted, such that the handle 94 simply turns idly (see FIG. 7). In this case, the pair of balls 122 moves from the tooth portions 112 so as to come into engagement with other adjacent tooth portions 112.

In this manner, in a completely open state in which the valve plug 62 is separated away from the valve seat 30, transmission of the rotational force T from the handle 94 to the shaft 56 is reliably and effectively interrupted by the switching mechanism 96. Owing thereto, when completely open, further displacement of the piston 38 and the valve plug 62 away from the valve seat 30 (in the direction of the arrow B) is impeded, and pressing of the piston 38 with excessive force against the stopper 136 is prevented.

Further, in the valve open state, the indicator shaft 80 is displaced upwardly in the indicator section 22, and the visually perceivable element 132 thereof is displaced into the projecting region of the cap 130, thereby enabling the visually perceivable element 132 to be visually confirmed from outside of the manual switching valve 10, such that a valve open state (ON indication) of the manual switching valve 10 can easily be confirmed.

Next, an explanation shall be made concerning a case in which the valve plug 62 is reseated with respect to the valve seat 30 from the valve open state (see FIG. 5) described above, thereby reestablishing the valve closed state (see FIG. 1).

At first, a worker (not shown) grips the handle 94 and rotates it in an opposite direction to that described previously, with a predetermined rotational force T, whereby the rotational force T imparted to the handle 94 is transmitted to the shaft 56 through the balls 122 of the switching mechanism 96, and the shaft 56 is rotated in the opposite direction.

In addition, the piston 38 that is in threaded engagement with the shaft 56 is displaced, by rotation of the shaft 56, along the piston chamber 40 in a direction (the direction of the arrow A) toward the valve seat 30, the upper end of the valve plug 62 is pressed in a downward direction by the small diameter portion 44 of the piston 38, and the valve plug 62 is displaced toward the valve seat 30. Further, accompanying displacement of the valve plug 62, the connecting shaft 82 and the indicator shaft 80 are displaced downward (in the direction of the arrow A).

Owing thereto, the valve plug 62 is displaced downwardly while the skirt 90 is flexed, and the valve part 88 is seated with respect to the valve seat 30, resulting in a valve closed condition (OFF state) in which communication between the first port 24 and the second port 26 through the communication passage 28 is interrupted.

Further, in the valve closed state, since the visually perceivable element 132 is displaced downwardly from the projecting region of the cap 130 in the indicator section 22, the visually perceivable element 132 cannot be seen, and the valve closed state (OFF indication) can be confirmed.

On the other hand, similar to the aforementioned completely open state, in a completely closed state in which the valve plug 62 is fully seated on the valve seat 30, it is conceivable that an operator might mistakenly continue rotating the handle 94. In this case, as shown in FIG. 1, since the valve plug 62 is already seated with respect to the valve seat 30, downward displacement of the piston 38, which is in abutment with an upper end of the valve plug 62, is regulated. As a result, the piston 38 cannot be displaced further downward, and along therewith, rotational displacement of the shaft 56 in threaded engagement with the piston 38 also is regulated.

In addition, in this case, an excessive rotational force Tmax is imparted with respect to the handle 94, wherein the rotational force Tmax is greater than the elastic force P of the springs 124 (Tmax>P), such that the balls 122 that are pressed by the elastic force P of the springs 124 are displaced toward the springs 124 (in the direction of the arrow C2), while being pushed out from the tooth portions 112 of the shaft 56. As a result, in the switching mechanism 96, the state of engagement between the balls 122 and the shaft 56 is released, and only the handle 94 is rotationally displaced with the balls 122 accommodated therein, such that the excessive rotational force Tmax imparted to the handle 94 is not transmitted with respect to the shaft 56.

In this manner, in the case that the handle 94 continues to be rotated after the valve plug 62 has been seated on the valve seat 30, transmission of the rotational force T from the handle 94 to the shaft 56 is reliably and effectively interrupted by the switching mechanism 96. Owing thereto, when completely closed, further displacement of the valve plug 62 toward the valve seat 30 (in the direction of the arrow A) is impeded, and pressing of the valve plug 62 with excessive force against the valve seat 30 is prevented.

As described above, in the present embodiment, a switching mechanism 96 is provided wherein excessive rotational forces Tmax imparted to the handle 94 are prevented from being transmitted to the shaft 56, wherein the switching mechanism 96 is constructed from a pair of balls 122 accommodated within the handle 94, springs 124 producing an elastic force P for energizing the balls 122, and tooth portions 112 of the shaft 56 in which the balls 122 are engaged. In this manner, compared to the conventional technique, in the switching mechanism 96 since a simpler structure can be used, both the number of parts and assembly operations therefor can be reduced.

When the valve plug 62 is completely closed with the valve plug 62 seated on the valve seat 30, as well as when the valve plug 62 is completely open with the piston 38 abutting against the stopper 136, further transmission of the rotational force T from the handle 94 to the shaft 56 is reliably and effectively interrupted by means of the switching mechanism 96 having a simple structure. As a result, displacement of the valve plug 62 toward the valve seat 30 when the valve is closed, as well as displacement of the piston 38 toward the stopper 136 when the valve is completely open, are both reliably prevented. Consequently, pressing of the valve plug 62 with respect to the valve seat 30 with an excessive force when the valve is already closed is prevented, thereby enabling an improvement in the durability of the valve plug 62 and the valve seat 30. Further, pressing of the piston 38 with excessive force with respect to the housing 16 is prevented, thus enabling an improvement in the durability of the piston 38.

Furthermore, it is preferable if the hardness of the balls 122 constituting the switching mechanism 96 is smaller compared to the hardness of the shaft 56 having the tooth portions 112. For example, the balls 122 are formed of nylon, polypropylene (PP) or the like, whereas the shaft 56 is made from a resin material having a comparatively large hardness, such as an ABS resin or the like.

More specifically, since the balls 122 normally engage at a predetermined pressing force P with respect to the tooth portions 112 of the shaft 56, after being used over an extended period of time, frictional wearing of the balls 122 respectively with respect to the tooth portions 112 tends to occur. In this case, because the hardness of the balls 122 is set to be smaller than the hardness of the shaft 56, frictional wearing of the balls is greater than that of the shaft 56. However, compared to the shaft 56, replacement of the balls 122 can be accomplished easily, and therefore, such maintenance can be carried out satisfactorily. Stated otherwise, by using balls 122 that have a low hardness, frictional wearing of the shaft 56 can be suppressed.

Furthermore, the cap 130 is disposed substantially centrally on the handle 94, which enables the indicator shaft 80 to be visually confirmed from the outside, and further, the cap 130 projects a given distance with respect to the side surface of the handle 94. Consequently, the visually perceivable element 132 of the indicator shaft 80, which is movable inside the cap 130, can reliably and easily be confirmed.

Still further, the cap 130 is installed in the installation hole 134 of the handle 94 through which the indicator shaft 80 is inserted, thereby closing the installation hole 134. Owing thereto, compared to a conventional manual valve, which is structured such that an indicator projects directly outward from an end surface of the handle 94, in the present embodiment, dust or the like that is generated within the valve body 12 is not discharged to the outside through the insertion hole 102 of the shaft 56, and from the installation hole 134.

The manual switching valve according to the present invention is not limited to the aforementioned embodiment, but various other features and structures may be adopted as a matter of course without deviating from the essential gist of the invention.

What is claimed is:

1. A manual switching valve comprising:
   a body having a passage through which a pressure fluid flows;
   a valve plug disposed displaceably inside of said body, for being seated on a valve seat formed in said body;
   a shaft disposed rotatably in said body, for causing displacement of said valve plug in an axial direction by rotation thereof;

an operating element supported on an end of said shaft, to which a predetermined rotational force is applied; and a switching mechanism disposed between said operating element and said shaft, for changing a transmittal state of the rotational force applied to said operating element to said shaft, wherein, in both completely open and completely closed states of said valve plug, in the event that the rotational force transmitted to the shaft from the operating element is excessive, transmission of the rotational force of said operating element to said shaft is interrupted by said switching mechanism, and wherein said switching mechanism comprises:

a ball disposed displaceably in a radial direction with respect to said shaft at an interior portion of said operating element;

a spring, which at all times imposes a force on said ball in said radial direction toward said shaft; and a plurality of arcuate shaped tooth portions disposed on an outer circumferential surface of said shaft facing said operating element, said ball engaging with said plurality of tooth portions, a radius of curvature of said arcuate shaped tooth portions being substantially the same as a radius of said ball, wherein said ball is continuously pressed toward said tooth portions and into engagement therewith by an elastic force of said spring, wherein, during both opening and closing operations of said valve plug and upon rotation of said operating element in both opening and closing directions, said switching mechanism transmits said rotational force from said operating element to said shaft in the event that the elastic force of said spring is larger than said rotational force, and interrupts the transmission of said rotational force from said operating element to said shaft in the event that the elastic force of said spring is smaller than said rotational force, and wherein said ball is formed from a resin material, a hardness of said ball being set to be smaller than a hardness of said tooth portions, whereby said ball is subjected to frictional wearing due to contact with said tooth portions at a rate exceeding frictional wearing of said tooth portions.

2. The manual switching valve according to claim 1, wherein a hole extending toward said tooth portions is provided in the interior portion of said operating element, said ball and said spring being installed in said hole, and said hole being closed by a bolt.

3. The manual switching valve according to claim 1, wherein said operating element includes a display element, which is displaced together with said valve plug along the axial direction, and which is displaced to positions indicating open and closed states of said valve plug, said display element being disposed in the central part of said operating element.

4. The manual switching valve according to claim 3, wherein said display element has a visually perceivable element connected to said valve plug, for enabling a valve open state and a valve closed state by said valve plug to be visually confirmed from the outside.

5. The manual switching valve according to claim 4, wherein said visually perceivable element is disposed on an end of a display shaft, which is displaceably disposed along the axial direction inside of said shaft.

6. The manual switching valve according to claim 1, wherein said ball comprises a pair of balls, which are arranged in facing relation to each other sandwiching said shaft therebetween.

7. The manual switching valve according to claim 6, wherein a lock pin is inserted into a pin groove formed on an outer circumferential surface of said shaft, whereby said lock pin regulates displacement of said shaft in the axial direction.

8. The manual switching valve according to claim 1, wherein said arcuate shaped tooth portions are recessed radially inwardly on an outer circumferential surface of an expanded diameter portion of said shaft, and said arcuate shaped tooth portions are disposed immediately adjacent to each other at equal angular intervals completely surrounding said outer circumferential surface such that respective arcs of adjacent tooth portions intersect at a common point.

* * * * *